(12) United States Patent
Chiu et al.

(10) Patent No.: US 10,591,800 B2
(45) Date of Patent: Mar. 17, 2020

(54) ELECTROPHORETIC DISPLAY AND DRIVING METHOD THEREOF

(71) Applicant: E Ink Holdings Inc., Hsinchu (TW)

(72) Inventors: Chen-Kai Chiu, Hsinchu (TW); Feng-Shou Lin, Hsinchu (TW); Chih-Yu Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/209,990

(22) Filed: Dec. 5, 2018

(65) Prior Publication Data

US 2019/0212626 A1 Jul. 11, 2019

(30) Foreign Application Priority Data

Jan. 5, 2018 (TW) .............................. 107100413 A

(51) Int. Cl.
*G02F 1/167* (2019.01)
*G02F 1/1676* (2019.01)
*G09G 3/34* (2006.01)
*G02F 1/1685* (2019.01)

(52) U.S. Cl.
CPC ............ *G02F 1/167* (2013.01); *G02F 1/1676* (2019.01); *G02F 1/1685* (2019.01); *G09G 3/344* (2013.01); *G09G 2300/0452* (2013.01); *G09G 2310/068* (2013.01); *G09G 2320/0242* (2013.01)

(58) Field of Classification Search
CPC ..... G02F 1/167; G02F 1/16757; G09G 3/344; G09G 2320/0242; G09G 2310/068
See application file for complete search history.

(56) References Cited

U.S. PATENT DOCUMENTS

| | | | |
|---|---|---|---|
| 2008/0024482 | A1 | 1/2008 | Gates et al. |
| 2013/0194250 | A1 | 8/2013 | Amundson et al. |
| 2015/0213765 | A1 | 7/2015 | Gates et al. |
| 2017/0148372 | A1 | 5/2017 | Emelie et al. |
| 2019/0331979 | A1* | 10/2019 | Takada ................ G02F 1/16761 |

* cited by examiner

*Primary Examiner* — Laurence J Lee
(74) *Attorney, Agent, or Firm* — JCIPRNET

(57) ABSTRACT

An electrophoretic display and a driving method thereof are provided. The electrophoretic display includes a display panel and a driving circuit. The display panel includes an electrophoretic unit and a driving substrate. The driving method includes: providing a resetting signal to the driving substrate to reset at least one of a first electrophoretic particle and a second electrophoretic particle in the electrophoretic unit; and providing a driving signal to the driving substrate to drive a third electrophoretic particle in the electrophoretic unit, wherein the driving signal includes a first driving period and a second driving period, and the first driving period occurs before the second driving period. In the first driving period, the driving signal includes a plurality of first driving pulses and a plurality of second driving pulses. In the second driving period, the driving signal includes a plurality of third driving pulses.

12 Claims, 4 Drawing Sheets

ELECTROPHORETIC DISPLAY AND DRIVING METHOD THEREOF

CROSS-REFERENCE TO RELATED APPLICATION

This application claims the priority benefit of Taiwan application serial no. 107100413, filed on Jan. 5, 2018. The entirety of the above-mentioned patent application is hereby incorporated by reference herein and made a part of this specification.

BACKGROUND

Technical Field

The disclosure relates to a display technique and more particularly relates to an electrophoretic display and a driving method thereof.

Description of Related Art

With the advances in electronic technology, electrophoretic displays have been widely used for various display applications and electronic devices, and the current electrophoretic displays are already capable of providing color display. However, the general color electrophoretic displays tend to have issues with sharpness that are caused by blurred image edges. Traditionally, such issues are improved by adjusting the terminal voltage and time of the driving signal to adjust the positions of the internal charged electrophoretic particles. In some environments, materials, or driving conditions, however, the sharpness issues cannot be amended. For example, the electrophoretic unit of the color electrophoretic display includes white electrophoretic particles, black electrophoretic particles, and color electrophoretic particles. When the electrophoretic display displays yellow letters with black background, the yellow letters may tend to have white edges, resulting in blurred letters and poor sharpness. In view of the above, several embodiments are provided hereinafter.

SUMMARY

The disclosure provides an electrophoretic display and a driving method thereof for efficiently driving electrophoretic particles of three different colors to achieve good display quality.

A driving method of the disclosure is adapted for an electrophoretic display. The electrophoretic display includes a driving substrate and an electrophoretic unit. The driving method includes: providing a resetting signal to the driving substrate to reset at least one of a first electrophoretic particle and a second electrophoretic particle in the electrophoretic unit; and providing a driving signal to the driving substrate to drive a third electrophoretic particle in the electrophoretic unit, wherein the driving signal includes a first driving period and a second driving period, and the first driving period occurs before the second driving period. In the first driving period, the driving signal includes a plurality of first driving pulses and a plurality of second driving pulses that are arranged alternately. In the second driving period, the driving signal includes a plurality of third driving pulses. The second driving pulses and the third driving pulses have the same polarity. The first driving pulses and the second driving pulses have opposite polarities.

An electrophoretic display of the disclosure includes an electrophoretic unit, a driving substrate, and a driving circuit. The electrophoretic unit includes a first electrophoretic particle, a second electrophoretic particle, and a third electrophoretic particle. The driving substrate is disposed under the electrophoretic unit. The driving circuit is coupled to the driving substrate. The driving circuit provides a resetting signal to the driving substrate to reset at least one of the first electrophoretic particle and the second electrophoretic particle in the electrophoretic unit. The driving circuit provides a driving signal to the driving substrate to drive the third electrophoretic particle in the electrophoretic unit. The driving signal includes a first driving period and a second driving period, and the first driving period occurs before the second driving period. In the first driving period, the driving signal includes a plurality of first driving pulses and a plurality of second driving pulses that are arranged alternately. In the second driving period, the driving signal includes a plurality of third driving pulses. The second driving pulses and the third driving pulses have the same polarity. The first driving pulses and the second driving pulses have opposite polarities.

Based on the above, in the electrophoretic display and the driving method thereof according to the disclosure, the third electrophoretic particles are driven efficiently by the second driving pulses and the third driving pulses of the driving signal, and when the electrophoretic display displays the color of the third electrophoretic particles, the first electrophoretic particles are effectively prevented from accumulating on the display side of the electrophoretic unit, such that the third electrophoretic particles are properly distributed on the display side of the electrophoretic unit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
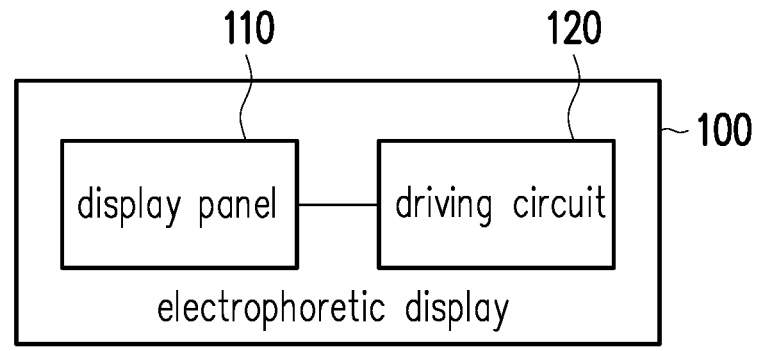
FIG. 1 is a block diagram of the electrophoretic display according to an embodiment of the disclosure.

In order to make the disclosure more comprehensible, embodiments are described below as examples to demonstrate that the disclosure can actually be realized. Moreover, elements/components/steps with the same reference numerals represent identical or similar parts in the drawings and embodiments wherever possible.

FIG. 1 is a block diagram of an electrophoretic display according to an embodiment of the disclosure. Referring to FIG. 1, the electrophoretic display 100 includes a display panel 110 and a driving circuit 120. In this embodiment, the electrophoretic display 100 is a color electrophoretic display device and has a display effect of displaying at least three colors. The display panel 110 includes a plurality of pixels, and the pixels respectively correspond to a plurality of electrophoretic units arranged in an array, wherein the electrophoretic units include electrophoretic particles of three colors. In this embodiment, the driving circuit 120 is configured to provide a driving signal to the display panel 110 for driving the electrophoretic particles in the electrophoretic units. In this embodiment, the driving circuit 120 drives the electrophoretic particles to move in the electrophoretic units by applying a voltage, so as to enable each pixel of the display panel 110 to display black, white, gray scale, or a specific color respectively. In this embodiment, the electrophoretic units are, for example, microcup structures and have white electrophoretic particles, black electrophoretic particles, and color electrophoretic particles. In each embodiment of the disclosure, the color electrophoretic particles refer to the third electrophoretic particles, and the color electrophoretic particles may be red electrophoretic particles or yellow electrophoretic particles, for example, but the disclosure is not limited thereto.

Figure 2:
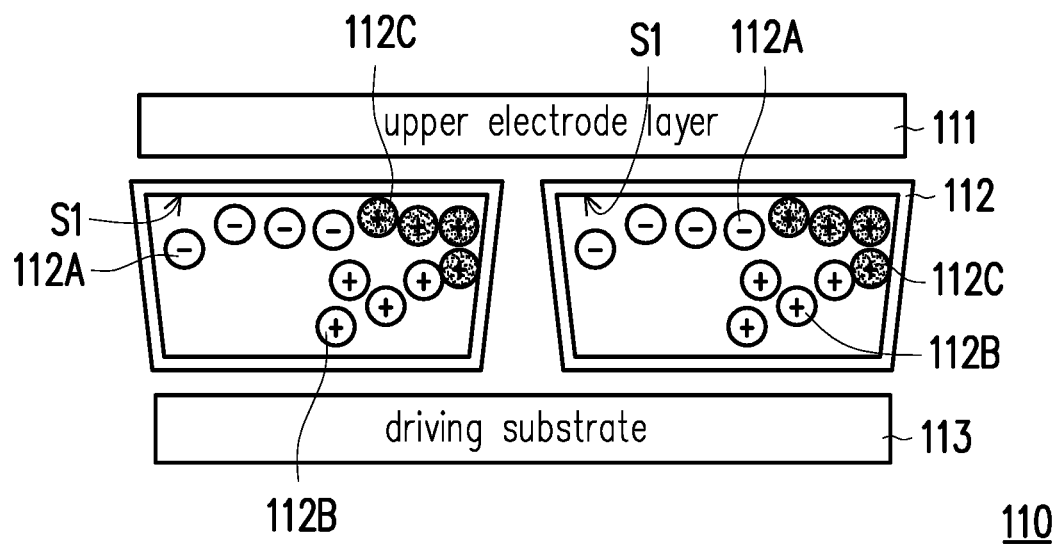
FIG. 2 is a schematic view of the display panel according to an embodiment of the disclosure.

FIG. 2 is a schematic view of the display panel according to an embodiment of the disclosure. Referring to FIG. 1 and FIG. 2, FIG. 2 is a schematic view of a plurality of electrophoretic units of the display panel 110. In this embodiment, one single pixel of the display panel 110 includes an upper electrode layer 111, a plurality of electrophoretic units 112, and a driving substrate 113. The electrophoretic units 112 are disposed between the upper electrode layer 111 and the driving substrate 113, and a display side S1 of the electrophoretic unit 112 is close to the upper electrode layer 111. In this embodiment, the upper electrode layer 111 is, for example, a transparent electrode layer. Each of the electrophoretic units 112 includes a plurality of first electrophoretic particles 112A, a plurality of second electrophoretic particles 112B, and a plurality of color electrophoretic particles 112C (i.e., the third electrophoretic particles). Nevertheless, the number of the electrophoretic units 112 and the number of the electrophoretic particles in the electrophoretic unit 112 are not limited to the example shown in FIG. 2. The driving substrate 113 includes, for example, a driving transistor, and the driving transistor receives a driving signal, so as to drive the first electrophoretic particles 112A, the second electrophoretic particles 112B, and the color electrophoretic particles 112C of the electrophoretic unit 112 to move in the electrophoretic unit 112.

In this embodiment, the first electrophoretic particles 112A may be negatively charged white electrophoretic particles, for example. The second electrophoretic particles 112B may be positively charged black electrophoretic particles, for example. The color electrophoretic particles 112C may be positively charged red electrophoretic particles or yellow electrophoretic particles, for example. In this embodiment, the color electrophoretic particles 112C have a charge amount lower than the second electrophoretic particles 112B. That is to say, when the driving substrate 113 applies a negative voltage, the first electrophoretic particles 112A that are negatively charged move toward the display side S1 of the electrophoretic unit 112. When the driving substrate 113 applies a higher positive voltage, the second electrophoretic particles 112B that are positively charged move toward the display side S1 of the electrophoretic unit 112. When the driving substrate 113 applies a lower positive voltage, the color electrophoretic particles 112C that are positively charged move toward the display side S1 of the electrophoretic unit 112. The moving speeds of the second electrophoretic particles 112B and the color electrophoretic particles 112C are determined according to the positive voltage applied by the driving substrate 113.

In this embodiment, when the driving circuit 120 drives the electrophoretic unit 112 to display a specific color (red or yellow), the driving circuit 120 first drives the first electrophoretic particles 112A (white) to the display side S1 of the electrophoretic unit 112, then drives the second electrophoretic particles 112B (black) to the display side S1 of the electrophoretic unit 112, and finally drives the color electrophoretic particles 112C to the display side S1 of the electrophoretic unit 112. In this embodiment, the driving circuit 120 may provide the voltage signal to the driving substrate 113 in four stages, which are a balancing stage, a mixing stage, a resetting stage, and a driving stage (or called a stacking stage), wherein the following describes the signal waveforms for driving the first electrophoretic particles 112A, the second electrophoretic particles 112B, and the color electrophoretic particles 112C with reference to FIG. 3A to FIG. 3C respectively.

Figure 3A:
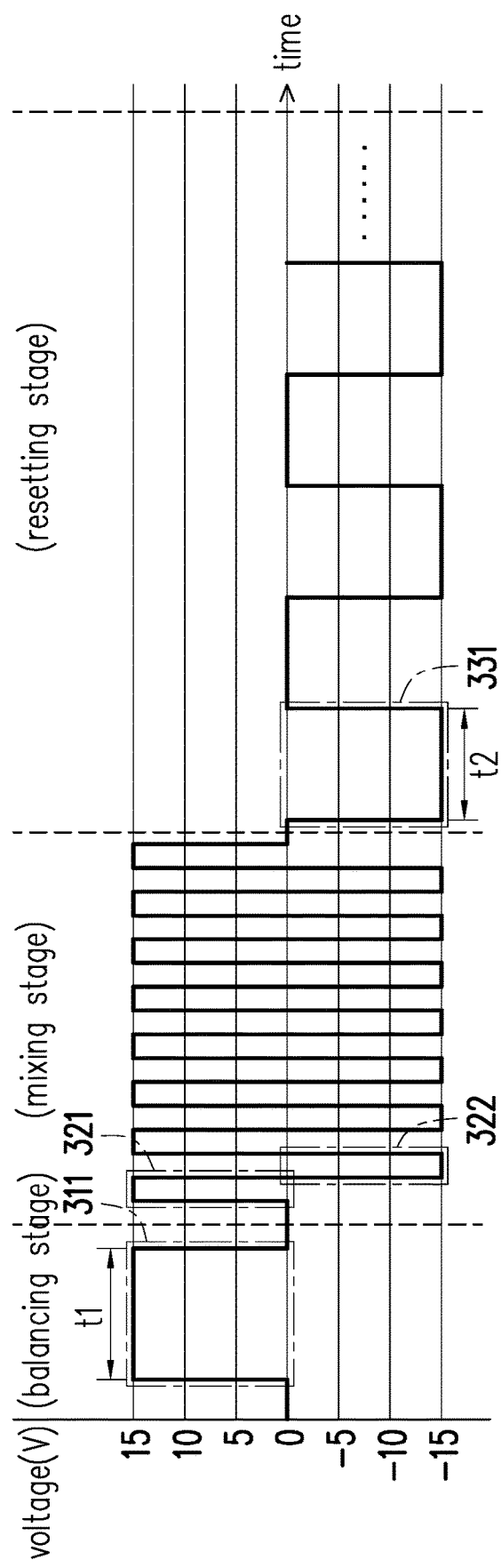
FIG. 3A is a signal waveform diagram of driving the first electrophoretic particles according to an embodiment of the disclosure.

FIG. 3A is a signal waveform diagram of driving the first electrophoretic particles according to an embodiment of the disclosure. Referring to FIG. 1 to FIG. 3A, in this embodiment, when the driving circuit 120 drives the electrophoretic unit 112 to display a specific color (red or yellow), the driving circuit 120 first drives the first electrophoretic particles 112A (white) to the display side S1 of the electrophoretic unit 112. Therefore, in the balancing stage, the driving circuit 120 provides a balancing signal to the driving substrate 113, so as to balance the charges of the first electrophoretic particles 112A. In this embodiment, the balancing signal includes a positive square wave signal 311, and the positive square wave signal 311 is a +15V (volt) voltage signal having a time length of t1, for example.

Next, in the mixing stage, the driving circuit 120 provides a mixing signal to the driving substrate 113, so as to uniformly disperse the first electrophoretic particles 112A, the second electrophoretic particles 112B, and the color electrophoretic particles 112C. In this embodiment, the mixing signal includes a plurality of positive pulse signals 321 and a plurality of negative pulse signals 322 that are arranged alternately. The positive pulse signals 321 are used to drive the first electrophoretic particles 112A. The negative pulse signals 322 are used to drive the second electrophoretic particles 112B and the color electrophoretic particles 112C. An amplitude of the positive pulse signal 321 is equal to an amplitude of the negative pulse signal 322. The positive pulse signal 321 is a +15V voltage signal, for example. The negative pulse signal 322 is a −15V voltage signal, for example.

Finally, in the resetting stage, the driving circuit 120 provides a resetting signal to the driving substrate 113, so as to reset the first electrophoretic particles 112A. In this embodiment, the resetting signal includes a plurality of negative square wave signals 331 for driving the first electrophoretic particles 112A to the display side S1 of the electrophoretic unit 112. In this embodiment, the negative square wave signal 331 is a −15V voltage signal having a time length of t2, for example. However, in an embodiment, the resetting signal includes 15 negative square wave signals 331, for example, and the time length t2 of each of the negative square wave signals 331 is 20 ms, but the disclosure is not limited thereto. Thereby, the first electrophoretic particles 112A are efficiently pushed to the display side S1 of the electrophoretic unit 112.

Figure 3B:
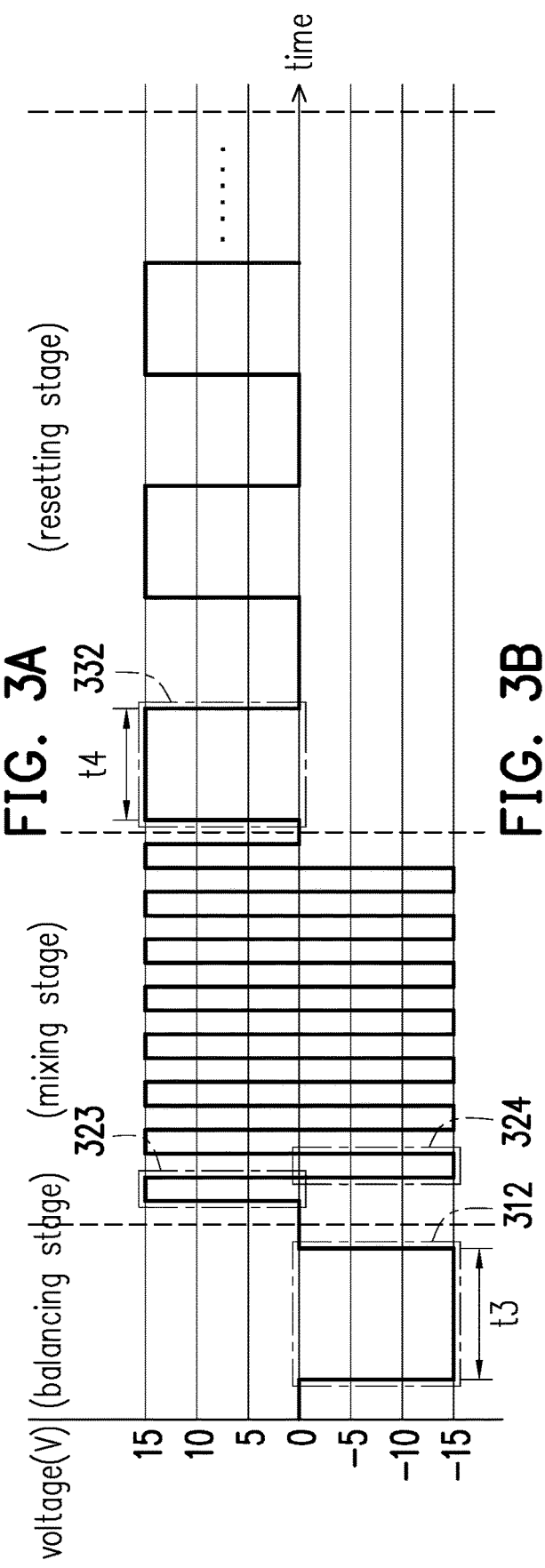
FIG. 3B is a signal waveform diagram of driving the second electrophoretic particles according to an embodiment of the disclosure.

FIG. 3B is a signal waveform diagram of driving the second electrophoretic particles according to an embodiment of the disclosure. Referring to FIG. 1, FIG. 2, and FIG. 3B, in this embodiment, the driving circuit 120 then drives the second electrophoretic particles 112B (black) to the display side S1 of the electrophoretic unit 112. Therefore, in the balancing stage, the driving circuit 120 provides a balancing signal to the driving substrate 113, so as to balance the charges of the second electrophoretic particles 112B. In this embodiment, the balancing signal includes a negative square wave signal 312, and the negative square wave signal 312 is a −15V voltage signal having a time length of t2, for example.

Next, in the mixing stage, the driving circuit 120 provides a mixing signal to the driving substrate 113, so as to uniformly disperse the first electrophoretic particles 112A, the second electrophoretic particles 112B, and the color electrophoretic particles 112C. In this embodiment, the mixing signal includes a plurality of positive pulse signals 323 and a plurality of negative pulse signals 324 that are arranged alternately, and the positive pulse signals 323 are used for driving the first electrophoretic particles 112A, and the negative pulse signals 324 are used for driving the second electrophoretic particles 112B and the color electrophoretic particles 112C. An amplitude of the positive pulse signal 323 is equal to an amplitude of the negative pulse signal 324. The positive pulse signal 323 is a +15V voltage signal, for example. The negative pulse signal 324 is a −15V voltage signal, for example.

Finally, in the resetting stage, the driving circuit 120 provides a resetting signal to the driving substrate 113, so as to reset the second electrophoretic particles 112B. In this embodiment, the resetting signal includes a plurality of positive square wave signals 332 for driving the second electrophoretic particles 112B to the display side S1 of the electrophoretic unit 112. In this embodiment, the positive square wave signal 332 is a +15V voltage signal having a time length of t4, for example. However, in an embodiment, the resetting signal includes 15 positive square wave signals 332, for example, and the time length t4 of each of the positive square wave signals 332 is 20 ms, but the disclosure is not limited thereto. Thereby, the second electrophoretic particles 112B are efficiently pushed to the display side S1 of the electrophoretic unit 112.

Figure 3C:
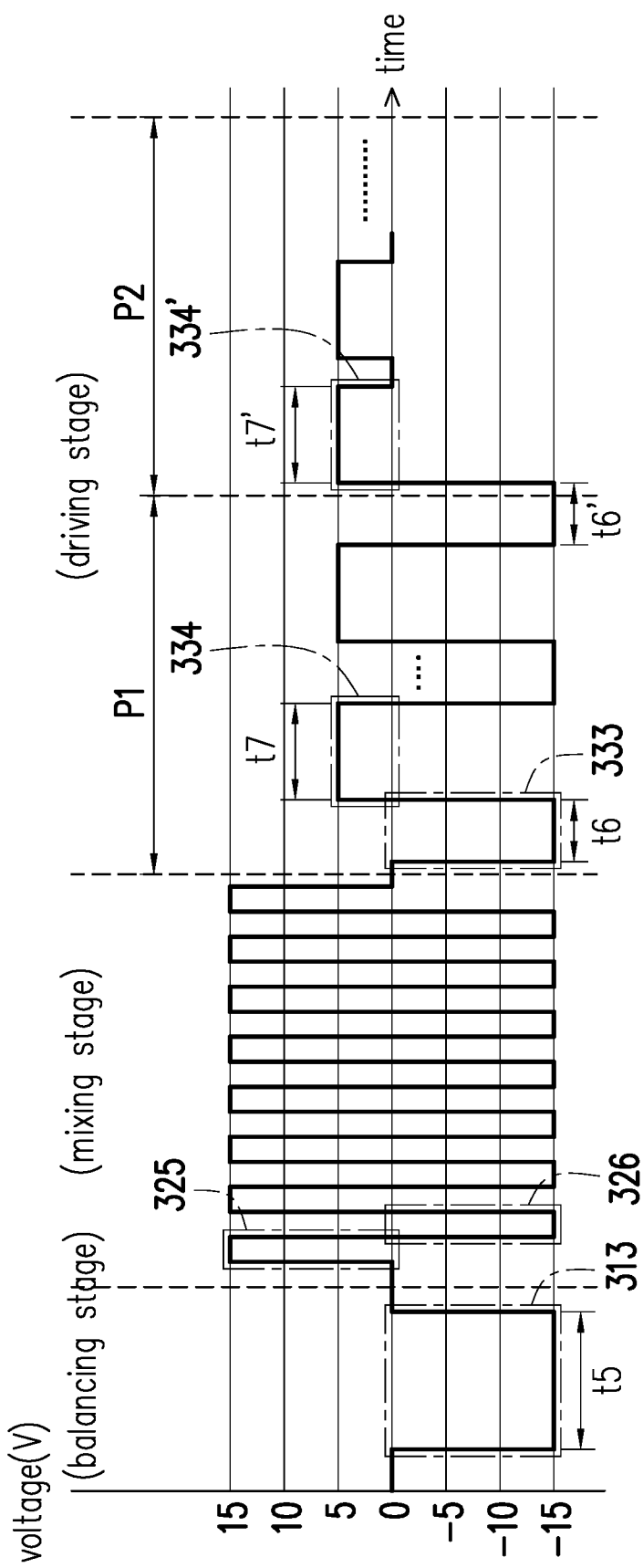
FIG. 3C is a signal waveform diagram of driving the color electrophoretic particles according to an embodiment of the disclosure.

FIG. 3C is a signal waveform diagram of driving the color electrophoretic particles according to an embodiment of the disclosure. Referring to FIG. 1, FIG. 2, and FIG. 3C, in this embodiment, the driving circuit 120 then drives the color electrophoretic particles 112C (red or yellow) to the display side S1 of the electrophoretic unit 112. Therefore, in the balancing stage, the driving circuit 120 provides a balancing signal to the driving substrate 113, so as to keep the first electrophoretic particles 112A, the second electrophoretic particles 112B, and the color electrophoretic particles 112C in the electrophoretic unit 112 in a charge-balanced state. In this embodiment, the balancing signal includes a negative square wave signal 313, and the negative square wave signal 313 is a −15V voltage signal having a time length of t5, for example.

Next, in the mixing stage, the driving circuit 120 provides a mixing signal to the driving substrate 113, so as to uniformly disperse the first electrophoretic particles 112A, the second electrophoretic particles 112B, and the color electrophoretic particles 112C. In this embodiment, the mixing signal includes a plurality of positive pulse signals 325 and a plurality of negative pulse signals 326 that are arranged alternately. The positive pulse signals 325 are used for driving the first electrophoretic particles 112A, and the negative pulse signals 326 are used for driving the second electrophoretic particles 112B and the color electrophoretic particles 112C. An amplitude of the positive pulse signal 325 is equal to an amplitude of the negative pulse signal 326. The positive pulse signal 325 is a +15V voltage signal, for example. The negative pulse signal 326 is a −15V voltage signal, for example.

Finally, in the driving stage, the driving circuit 120 provides a driving signal to the driving substrate 113, so as to drive the first electrophoretic particles 112A and the color electrophoretic particles 112C. In other words, in the process of driving the color electrophoretic particles 112C, the driving circuit 120 simultaneously pushes the first electrophoretic particles 112A to specific equal positions and pushes the color electrophoretic particles 112C to the display side S1 of the electrophoretic unit 112. In this embodiment, the driving signal includes a plurality of first driving pulses 333, a plurality of second driving pulses 334, and a plurality of third driving pulses 334'. The first driving pulses 333 are used for driving the first electrophoretic particles 112A, and the second driving pulses 334 and the third driving pulses 334' are used for driving the color electrophoretic particles 112C. The second driving pulses 334 and the third driving pulses 334' have the same polarity (both positive voltage pulses), and the first driving pulses 333 and the second driving pulses 334 have opposite polarities (the first driving pulses 333 are negative voltage pulses while the second driving pulses 334 are positive voltage pulses).

In this embodiment, the driving signal includes a first driving period P1 and a second driving period P2, and the first driving period P1 occurs before the second driving period P2. In the first driving period P1, the driving signal includes the first driving pulses 333 and the second driving pulses 334 that are arranged alternately, and the first driving period P1 starts with the first driving pulse 333. In the second driving period P2, the driving signal includes the third driving pulses 334', and the driving signal has the last one of the first driving pulses 333 before the third driving pulses 334'. In this embodiment, the number of the first driving pulses 333 is smaller than a sum of the second driving pulses 334 and the third driving pulses 334'. An amplitude of the first driving pulse 333 is greater than an amplitude of the second driving pulse 334. The time length t6, t6' of the first driving pulse 333 is shorter than a time length t7 of the second driving pulse 334 and a time length t7' of the third driving pulse 334'. That is to say, when the driving circuit 120 drives the color electrophoretic particles 112C by the second driving pulses 334, the driving circuit 120 drives the first electrophoretic particles 112A in advance before each pulse of the second driving pulses 334, so as to push the first electrophoretic particles 112A to the specific equal positions in the electrophoretic unit 112. In other words, the driving stage actually includes the time for resetting the first electrophoretic particles 112A to the specific equal positions in the electrophoretic unit 112.

In this embodiment, the first driving pulse 333 is a −15V voltage signal having the time length of t6, t6', for example. The second driving pulse 334 is a +5V voltage signal having the time length of t7, for example. The third driving pulse 334' is a +5V voltage signal having the time length of t7', for example. Moreover, before the third driving pulses 334', the driving signal has the last one of the first driving pulses 333, wherein the last one of the first driving pulses 333 is a −15V voltage signal having the time length of t6', for example. In an embodiment, the driving signal may include 7 first driving pulses 333, and the sum of the second driving pulses 334 and the third driving pulses 334' is 9. The time length t6, t6' of each of the first driving pulses 333 may be 60 ms. The time length t7 of each of the second driving pulses 334 may be 500 ms, and the time length t7' of each of the third driving pulses 334' may also be 500 ms, but the disclosure is not limited thereto. However, in another embodiment, the time length t6' of the last one of the first driving pulses 333 may be the same as or different from the time lengths t6 of the other first driving pulses 333. Also, a voltage level or the time length t7 of the second driving pulse 334 may be the same as or different from a voltage level or the time length t7' of the third driving pulse 334'. The voltage level of the second driving pulse 334 is in a range of 0V to 15V, that is, 0V to a value smaller than or equal to the amplitude of the first driving pulse 333. As a result, the color electrophoretic particles 112C are efficiently pushed to the display side S1 of the electrophoretic unit 112, and the first electrophoretic particles 112A are efficiently pushed to the specific equal positions in the electrophoretic unit 112.

Referring to FIG. 1 to FIG. 3C, more specifically, when the electrophoretic unit 112 is actually driven to display a specific color (red or yellow) on the display side S1, the driving circuit 120 provides all the signals as shown in FIG. 3A to FIG. 3C to the driving substrate 113 (combining the voltage signals of the waveforms of FIG. 3A to FIG. 3C), so as to drive the first electrophoretic particles 112A, the second electrophoretic particles 112B, and the color electrophoretic particles 112C in the electrophoretic unit 112. It should be noted that the times of the voltage signals of FIG. 3A to FIG. 3C do not correspond to one another. The voltage signals of FIG. 3A to FIG. 3C in the balancing stage, the mixing stage, the resetting stage, and the driving stage are provided to the driving substrate 113 sequentially.

Specifically, first, in the balancing stage, the driving circuit 120 provides the balancing signal to the driving substrate 113. The balancing signal includes, for example, the positive square wave signal 311, the negative square wave signal 312, and the negative square wave signal 313 sequentially, so as to balance the accumulated charges of each electrophoretic particle of the electrophoretic unit 112 in the resetting stage and the driving stage. Therefore, when the driving is completed, each electrophoretic particle of the electrophoretic unit 112 is in a charge-neutralized state. In this embodiment, the voltage amplitudes, the time lengths, and the order of the positive square wave signal 311, the negative square wave signal 312, and the negative square wave signal 313 may be determined according to different requirements of charge balancing and thus are not particularly limited.

Next, in the mixing stage, the driving circuit 120 provides the mixing signal to the driving substrate 113. The mixing signal includes a plurality of positive pulse signals 321, 323, and 325 and a plurality of negative pulse signals 322, 324, and 326 that are arranged alternately, so as to uniformly distribute the first electrophoretic particles 112A, the second electrophoretic particles 112B, and the color electrophoretic particles 112C in the electrophoretic unit 112. Moreover, in this embodiment, the voltage amplitudes, the time lengths, and the order of the positive pulse signals 321, 323, and 325 and the negative pulse signals 322, 324, and 326 may be determined according to the characteristics of different electrophoretic particles and thus are not particularly limited.

Next, in the resetting stage, the driving circuit 120 provides the resetting signal to the driving substrate 113 to reset the first electrophoretic particles 112A and the second electrophoretic particles 112B. In this embodiment, the driving circuit 120 first resets the first electrophoretic particles 112A and then resets the second electrophoretic particles 112B, so that the first electrophoretic particles 112A are first accumulated on the display side S1 of the electrophoretic unit 112, and then the second electrophoretic particles 112B are accumulated on the display side S1 of the electrophoretic unit 112. Therefore, the driving circuit 120 first provides a plurality of negative square wave signals 331 to the driving substrate 113 and then provides a plurality of positive square wave signals 332 to the driving substrate 113. Moreover, in this embodiment, the voltage amplitudes, the time lengths, and the order of the negative square wave signals 331 and the positive square wave signals 332 may be determined according to the characteristics of different electrophoretic particles and thus are not particularly limited.

Finally, in the driving stage, the driving circuit 120 provides the driving signal to the driving substrate 113, so as to drive the first electrophoretic particles 112A and the color electrophoretic particles 112C. Take FIG. 3C as an example, in the first driving period P1, the driving circuit 120 first pulls down the −15V voltage signal to push the first electrophoretic particles 112A to move toward the specific equal positions in the electrophoretic unit 112. Then, the driving circuit 120 provides the +5V voltage signal to push the color electrophoretic particles 112C to move toward the display side S1 of the electrophoretic unit 112. The driving circuit 120 outputs the −15V voltage signal and the +5V voltage signal cyclically. After the pushing of the first electrophoretic particles 112A is completed, in the second driving period P2, the driving circuit 120 continues to provide a plurality of +5V voltage signals to push the color electrophoretic particles 112C to move toward the display side S1 of the electrophoretic unit 112. Before these +5V voltage signals, the driving signal first pulls down a −15V voltage signal. When the second driving period P2 ends, the first electrophoretic particles 112A are located at the specific equal positions in the electrophoretic unit 112, and the color electrophoretic particles 112C are accumulated on the display side S1 of the electrophoretic unit 112. In addition, in this embodiment, the voltage amplitudes, the time lengths, and the order of the driving pulses of the driving signal may be determined according to the characteristics of different electrophoretic particles and thus are not particularly limited.

Figure 4:
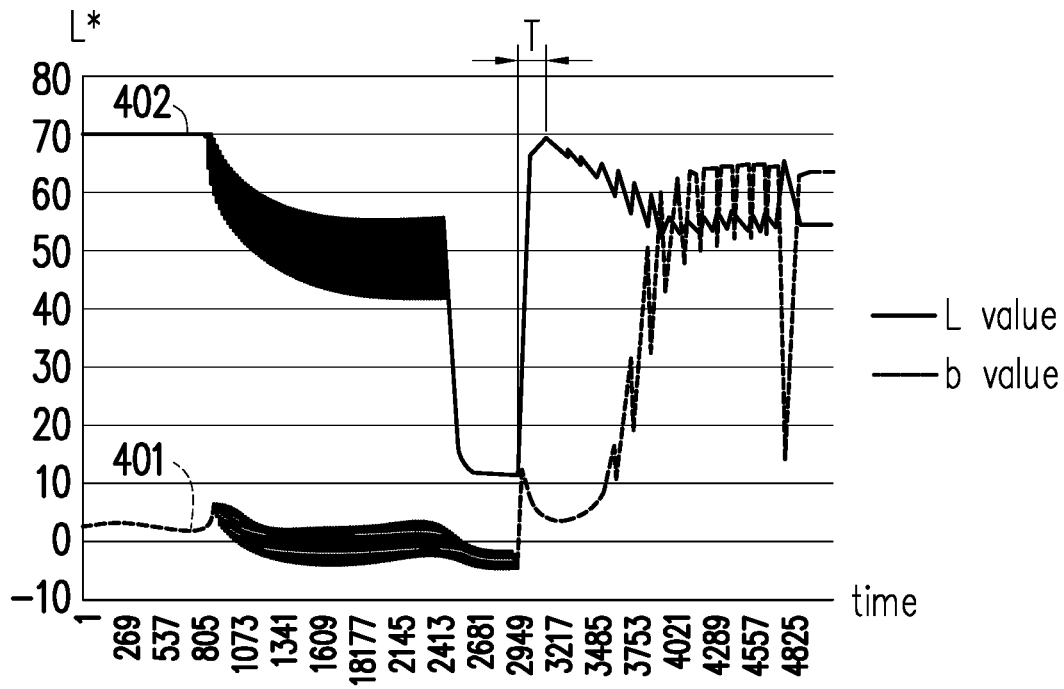
FIG. 4 is a graph of brightness variation according to an embodiment of the disclosure.

FIG. 4 is a graph of brightness variation according to an embodiment of the disclosure. Referring to FIG. 1, FIG. 2, and FIG. 4, for example, when the driving circuit 120 drives the electrophoretic unit 112 according to the voltage signals shown in FIG. 3A to FIG. 3C to enable the electrophoretic unit 112 to display a specific color (e.g., yellow), the L value variation curve 401 drops to a brightness value (L*) of 50 to 60 after rising quickly in the time interval T of the resetting stage, and the b value variation curve 402 rises and remains at a brightness of 60 to 70 after the resetting stage. In this example, the unit of the brightness value is cd/m$^2$, for example. In this example, the L value variation curve 401 indicates whether the first electrophoretic particles 112A (white) are driven to the display side S1 of the electrophoretic unit 112. The b value variation curve 402 indicates whether the color electrophoretic particles 112C (e.g., yellow) are driven to the display side S1 of the electrophoretic unit 112.

In this example, when the driving circuit 120 drives the color electrophoretic particles 112C to move toward the display side S1 of the electrophoretic unit 112, the driving circuit 120 simultaneously drives the first electrophoretic particles 112A to move toward the specific equal positions in the electrophoretic unit 112. Therefore, it prevents the first electrophoretic particles 112A from being driven to the display side S1 of the electrophoretic unit 112 for a long time and thereby avoids white edges that are caused by the first electrophoretic particles 112A driven on the display side S1 of the electrophoretic unit 112 when the color electrophoretic particles 112C are driven after the driving of the first electrophoretic particles 112A ends. In other words, the driving method of the disclosure effectively shortens the time length of the time interval T to effectively prevent white edges that occur at the pixel edges when the pixels display a specific color (e.g., yellow).

Figure 5:
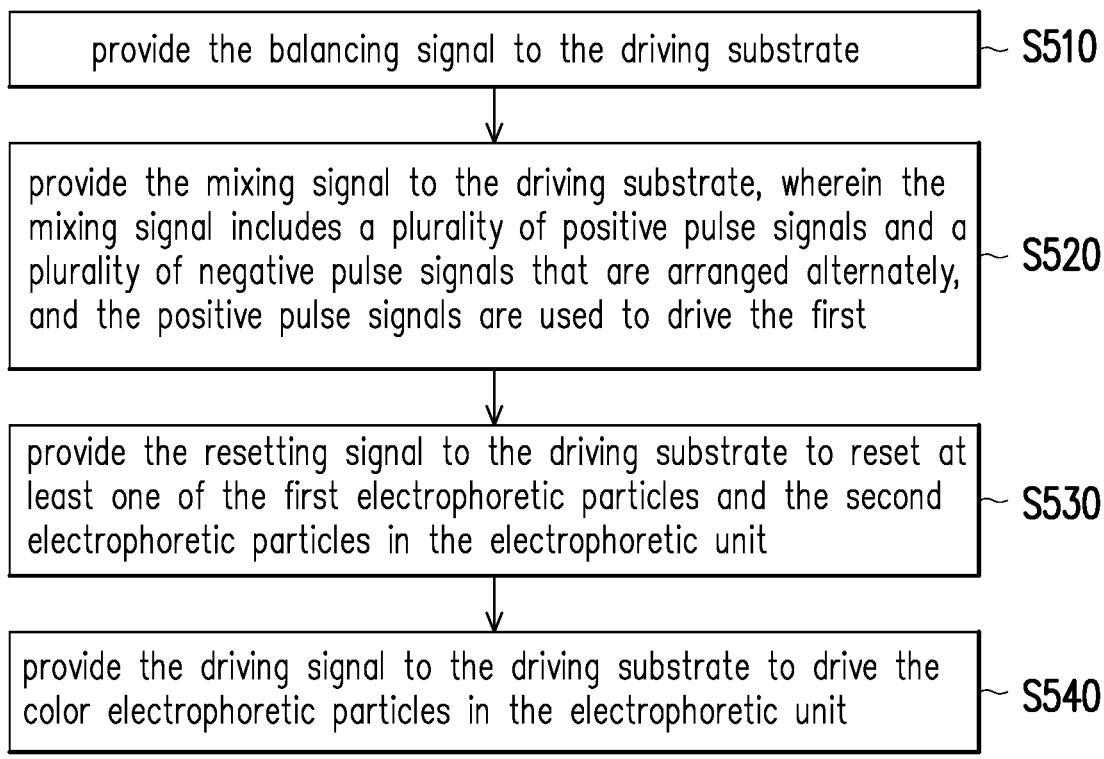
FIG. 5 is a flowchart of the driving method according to an embodiment of the disclosure.

FIG. 5 is a flowchart of a driving method according to an embodiment of the disclosure. Referring to FIG. 1, FIG. 2, and FIG. 5, the driving method of FIG. 5 is at least adapted for the electrophoretic display 100 of FIG. 1. In Step S510, the driving circuit provides the balancing signal to the driving substrate. In Step S520, the driving circuit 120 provides the mixing signal to the driving substrate 113, wherein the mixing signal includes a plurality of positive pulse signals and a plurality of negative pulse signals that are arranged alternately, and the positive pulse signals are used to drive the first electrophoretic particles 112A and the negative pulse signals are used to drive the second electrophoretic particles 112B. In Step S530, the driving circuit 120 provides the resetting signal to the driving substrate 113 to reset at least one of the first electrophoretic particles 112A and the second electrophoretic particles 112B in the electrophoretic unit 112. In Step S540, the driving circuit 120 provides the driving signal to the driving substrate 113 to drive the color electrophoretic particles 112C in the electrophoretic unit 112, wherein the driving signal includes the first driving period and the second driving period, and the first driving period occurs before the second driving period. In the first driving period, the driving signal includes a plurality of first driving pulses and a plurality of second driving pulses that are arranged alternately. In the second driving period, the driving signal includes a plurality of third driving pulses. The second driving pulses and the third driving pulses have the same polarity, and the first driving pulses and the second driving pulses have opposite polarities. Therefore, in this embodiment, when the electrophoretic display 100 displays the color of the color electrophoretic particles 112C, the first electrophoretic particles 112A are effectively prevented from accumulating on the display side S1 of the electrophoretic unit 112, such that the color electrophoretic particles 112C are properly distributed on the display side S1 of the electrophoretic unit 112.

In addition, the detailed technical features and implementation of the electrophoretic display 100 and the signal waveforms of this embodiment may be sufficiently understood from the teaching, suggestion, and description of the embodiments of FIG. 1 to FIG. 4 and thus are not repeated here.

To sum up, the electrophoretic display and the driving method thereof according to the disclosure effectively drive the first electrophoretic particles, the second electrophoretic particles, and the third electrophoretic particles (for example, the color electrophoretic particles in the embodiments of the disclosure) in the electrophoretic unit by the voltage signals of the balancing stage, the mixing stage, the resetting stage, and the driving stage, and drive the first electrophoretic particles to the specific equal positions in the electrophoretic unit and drive the third electrophoretic particles to the display side of the electrophoretic unit by the first driving pulses and the second driving pulses alternately arranged in the driving signal. Therefore, when the display panel displays the color of the third electrophoretic particles, the electrophoretic display and the driving method thereof according to the disclosure effectively prevent the first electrophoretic particles from being accumulated on the edge of the display side of the electrophoretic unit, such that the third electrophoretic particles are properly distributed on the display side of the electrophoretic unit. Accordingly, the electrophoretic display and the driving method thereof according to the disclosure achieve good display quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving method adapted for an electrophoretic display, wherein the electrophoretic display comprises a display panel and a driving circuit, and the display panel comprises an electrophoretic unit and a driving substrate, the driving method comprising:
   providing a resetting signal to the driving substrate to reset at least one of a first electrophoretic particle and a second electrophoretic particle in the electrophoretic unit; and
   providing a driving signal to the driving substrate to drive a third electrophoretic particle in the electrophoretic unit, wherein the driving signal comprises a first driving period and a second driving period, and the first driving period occurs before the second driving period,
   wherein in the first driving period, the driving signal comprises a plurality of first driving pulses and a plurality of second driving pulses that are arranged alternately, and in the second driving period, the driving signal comprises a plurality of third driving pulses, wherein the second driving pulses and the third driving pulses have a same polarity, and the first driving pulses and the second driving pulses have opposite polarities.

2. The driving method according to claim 1, wherein the driving signal comprises a last one of the first driving pulses before the third driving pulses.

3. The driving method according to claim 1, wherein the first driving pulses drive the first electrophoretic particle in the electrophoretic unit and the second driving pulses drive the third electrophoretic particle in the electrophoretic unit.

4. The driving method according to claim 1, wherein the number of the first driving pulses is smaller than a sum of the number of the second driving pulses and the number of the third driving pulses, an amplitude of the first driving pulses is greater than or equal to an amplitude of the second driving pulses, and a time length of the first driving pulses is shorter than a time length of the second driving pulses.

5. The driving method according to claim 1, wherein the first electrophoretic particle is a white electrophoretic particle, the second electrophoretic particle is a black electrophoretic particle, and the third electrophoretic particle is a color electrophoretic particle.

6. The driving method according to claim 5, wherein the third electrophoretic particle is a yellow electrophoretic particle or a red electrophoretic particle.

7. An electrophoretic display, comprising:
a display panel, comprising:
an electrophoretic unit, comprising a first electrophoretic particle, a second electrophoretic particle, and a third electrophoretic particle; and
a driving substrate disposed under the electrophoretic unit; and
a driving circuit coupled to the driving substrate to drive the display panel,
wherein the driving circuit provides a resetting signal to the driving substrate to reset at least one of the first electrophoretic particle and the second electrophoretic particle in the electrophoretic unit, and the driving circuit provides a driving signal to the driving substrate to drive the third electrophoretic particle in the electrophoretic unit, wherein the driving signal comprises a first driving period and a second driving period, and the first driving period occurs before the second driving period,
wherein in the first driving period, the driving signal comprises a plurality of first driving pulses and a plurality of second driving pulses that are arranged alternately, and in the second driving period, the driving signal comprises a plurality of third driving pulses, wherein the second driving pulses and the third driving pulses have a same polarity, and the first driving pulses and the second driving pulses have opposite polarities.

8. The electrophoretic display according to claim 7, wherein the driving signal comprises a last one of the first driving pulses before the third driving pulses.

9. The electrophoretic display according to claim 7, wherein the first driving pulses drive the first electrophoretic particle in the electrophoretic unit and the second driving pulses drive the third electrophoretic particle in the electrophoretic unit.

10. The electrophoretic display according to claim 7, wherein the number of the first driving pulses is smaller than a sum of the number of the second driving pulses and the number of the third driving pulses, an amplitude of the first driving pulses is greater than or equal to an amplitude of the second driving pulses, and a time length of the first driving pulses is shorter than a time length of the second driving pulses.

11. The electrophoretic display according to claim 7, wherein the first electrophoretic particle is a white electrophoretic particle, the second electrophoretic particle is a black electrophoretic particle, and the third electrophoretic particle is a color electrophoretic particle.

12. The electrophoretic display according to claim 11, the third electrophoretic particle is a red electrophoretic particle or a yellow electrophoretic particle.

* * * * *